United States Patent [19]

Frutschi

[11] Patent Number: 4,523,432
[45] Date of Patent: Jun. 18, 1985

[54] AIR STORAGE POWER STATION

[75] Inventor: Hans-Ulrich Frutschi, Riniken, Switzerland

[73] Assignee: BBC Brown, Boveri & Company, Limited, Baden, Switzerland

[21] Appl. No.: 429,460

[22] Filed: Sep. 30, 1982

[30] Foreign Application Priority Data

Nov. 16, 1981 [CH] Switzerland ............... 7344/81

[51] Int. Cl.³ ............... F02C 1/04; F02C 1/06
[52] U.S. Cl. ............... 60/659; 60/646; 60/656; 60/650; 60/727
[58] Field of Search ............... 60/398, 659, 727, 646, 60/656, 650, 682

[56] References Cited

U.S. PATENT DOCUMENTS 4,150,547  4/1979  Hobson ............... 60/659

FOREIGN PATENT DOCUMENTS 115826  9/1981  Japan ............... 60/727
383859  8/1973  U.S.S.R. ............... 60/652

Primary Examiner—Allen M. Ostrager
Attorney, Agent, or Firm—Oblon, Fisher, Spivak, McClelland & Maier

[57] ABSTRACT

In an air storage power station heat is withdrawn from the compression process via a heating element (18) and passed into a heat storage device (15). During turbine operation the cold compressed air taken from the air reservoir (1) is first pre-heated with the stored heat in an air heater (21) and then passes via the recuperator (14) to the gas turbine (12′,12″). In this way low-temperature corrosion at the exchange surfaces of the recuperator (14) on the flue gas side is avoided, especially during start-up of the gas turbine.

1 Claim, 2 Drawing Figures

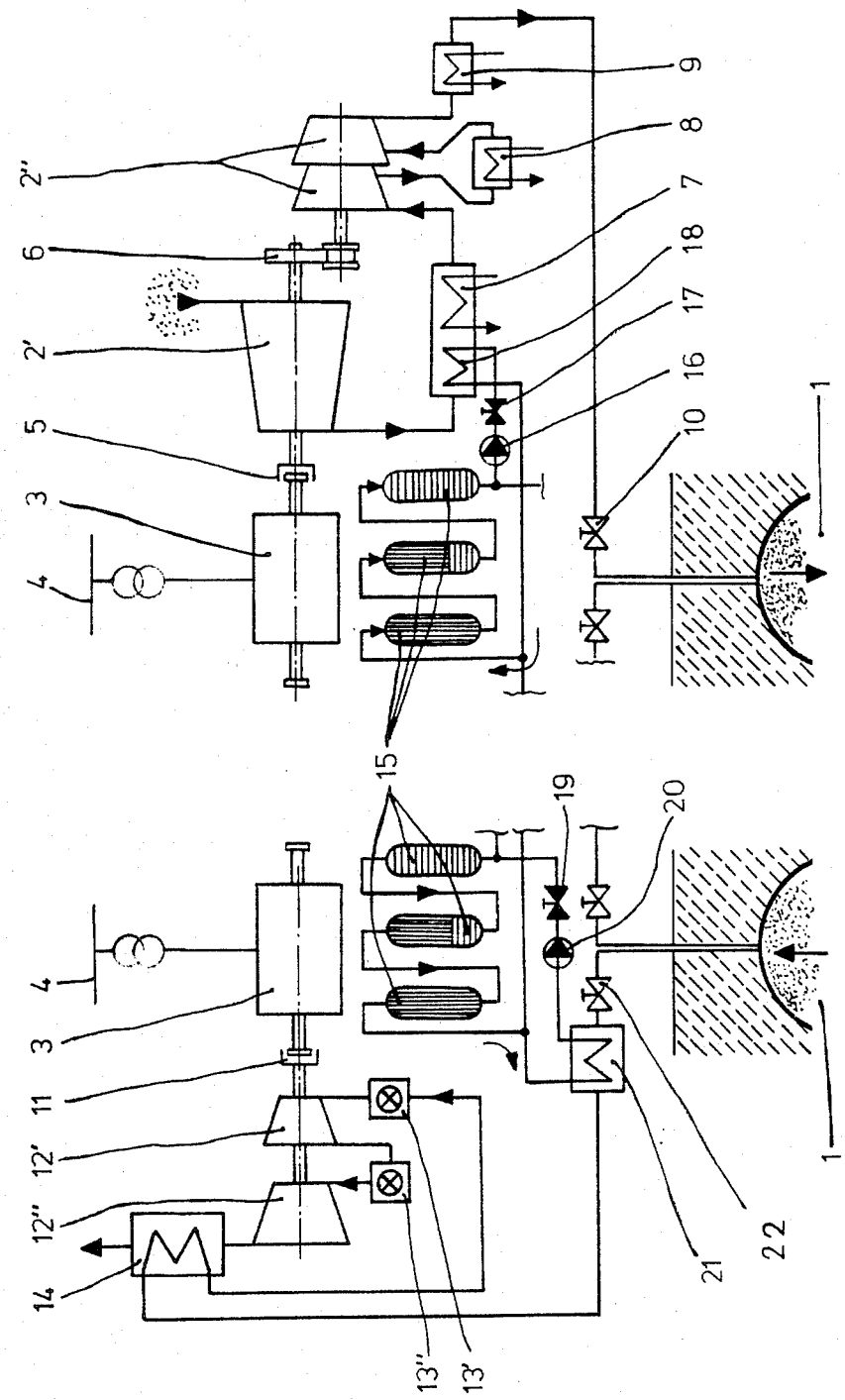

AIR STORAGE POWER STATION

BACKGROUND OF THE INVENTION

This invention concerns an air storage power station, consisting essentially of a gas turbine with a combustion chamber connected upstream and a recuperator connected downstream, a compressor with at least one intercooler and an aftercooler, an electrical machine and an air reservoir.

Such installations are particularly attractive where the night-time output reserves of base load electricity generating plants cannot be utilized. Excess energy generated at night is then stored in pneumatic form in subterranean cavities. During the day this energy is available to cover the day-time peaks.

The first air storage gas turbine installation of the kind described is the Huntorf power station in the Federal Republic of Germany, described in Brown Boveri Mitteilungen, January 1977, Volume 64, pages 34 to 39. In order to reduce the fuel consumption and to adjust the waste gas temperatures to values which are usual in steam power stations, this plant's construction already envisages the application of a recuperator, in which the waste heat from the gas turbine is transferred to the compressed air.

This arrangement has the disadvantage, that the cold compressed air from the air reservoir has, because of low-temperature corrosion, a damaging effect on the flue gas side of the recuperator.

SUMMARY OF THE INVENTION

The object of the invention is to provide means with which, on start-up of the gas turbine, the temperatures of the recuperator exchange surfaces are already so high that the temperature of the flue gases does not fall below their acid dew point.

Air storage plants with so called "adiabatic operation"—i.e. operation without a gas turbine combustion chamber—are indeed known, in which the air leaving the air reservoir before entry into the gas turbine is heated by means of an air storage device in which the air that has been compressed was cooled during the charging process. However, this arrangement is based on an air storage circulation which differs considerably from that described above as far as the turbine process and compression process are concerned. The heat storage device known in this way fulfils the function of the otherwise usual combustion chamber, so that the heat exchange constitutes a genuine heating of the air to the gas turbine entry temperature.

In contrast to this, the invention is concerned solely with a first air pre-heating. In this way the extremely unfavorable temperature conditions in the recuperator obtaining during the start-up phase of the gas turbine are overcome. Furthermore there is the possibility, if the heat storage device and the heat extraction places are properly dimensioned, of maintaining the air pre-heating according to the invention even during the whole operation on load.

BRIEF DESCRIPTION OF THE DRAWINGS

The drawing shows an exemplary embodiment of the invention, the charging and the discharging process of the air reservoir being shown separately for the sake of clarity.

FIG. 1 shows those parts of the plant involved in the charging process of the air reservoir and the heat storage device;

FIG. 2 shows the parts of the plant involved in operation on load.

DETAILED DESCRIPTION OF THE PREFERRED EMBODIMENTS

In both Figures, in which elements not material to the invention are not shown, the same elements are given the same reference numbers. The direction of flow of the various working fluids and heat carriers, i.e. air, is denoted by arrows.

In the arrangement shown in the Figures the multi-cylinder compressor 2', 2'' is driven, for the purpose of charging the air reservoir 1—partially represented as a subterranean cavity—by the electrical machine 3 operated as a motor. The latter is connected with the main power line 4 indicated schematically. The low pressure compressor 2' is driven directly via the coupling 5, which can be disengaged when stationary, while the high pressure compressor 2'' is driven via the gear 6.

In a first intercooler 7 heat is removed from the air aspirated from the atmosphere after the low pressure compression. A second intercooler 8 is provided for cooling the high pressure compressor 2''. The intercooling has the purpose of minimizing the compressor power requirements. After the final compression the air is cooled in the aftercooler 9 to the reservoir temperature and passes via the open shut-off device 10 into the cavity. The aftercooling maximizes the air density in the reservoir 1. Water is used as the cooling medium in all the heat exchangers 7, 8, 9 mentioned.

As soon as the charging process is complete, the shut-off device 10 is closed and the compressor 2', 2'' is stopped and de-coupled. The air compressed into the cavity is now available for the turbine operation.

To this end the electrical machine 3 now operating as a generator is connected via the coupling 11 with the dual-cylinder gas turbine 12', 12'' arranged on one shaft. The air valve 22 is opened which starts up the gas turbine. The air thus flows first through the high pressure combustion chamber 13', is then partially expanded in the high pressure gas turbine 12', then flows through the low pressure combustion chamber 13'', is expanded in the low pressure gas turbine 12'' to the final pressure and then passes to atmosphere through a flue, which is not shown. The combustion chambers 13' and 13'' are fired in order to raise the performance. The energy liberated in the expansion, after conversion in the electrical machine 3, is passed to the main power line 4.

One installation is at present already in operation. It is further known that provision is made to use a recuperator 14 fed with the waste gases from the gas turbine in order to reduce the specific heat consumption. This then creates the problem that the compressed air, which is about atmospheric temperature in the air reservoir 1, will lead to very low temperatures of the heat exchange surfaces in the recuperator 14 on start-up of the gas turbine 12', 12'', which causes the already mentioned low temperature corrosion on the flue gas side of the recuperator 14.

In order to remedy this, the air during turbine operation is, according to the invention, pre-heated upstream of the recuperator 14 by a heat storage device 15. The turbine flue gases thus fall below the acid dew point temperature at most for an extremely short time and harmlessly when entering the recuperator 14. In the present case the heat storage device 15 consists of a column of three storage vessels arranged in series, through which a heat carrier, preferably water, can flow in both directions. Water flows in two separable partial circuits.

The charging process of this hot water storage device 15, which takes place at the same time as the charging of the air reservoir 1, is explained by means of FIG. 1:

Water under pressure is pumped in a closed circuit by means of a circulating pump 16 with open shut-off device 17 through an additional heating element 18 arranged in the intercooler 7, is heated there and is stored as heating water in the vessels 15 (vertical hatching). Because of the closed circuit the cold water (horizontal hatching) is forced at the same time out of the storage device 15 and into the pump 16. It will be understood that the duration of the charging process is a function of the storage volume and the circulating velocity.

At the beginning of the generator operation shown in FIG. 2 the second partial circulation is started. For this purpose the circulating pump 20 is started with the shut-off device 19 open; it moves the hot water from the storage device 15 through an air heater 21, which is arranged upstream of the recuperator 14 with respect to the air side. The compressed air leaving the air reservoir 1 is heated to such an extent by passage through this air heater 21, that the flue gases produced after firing the combustion chambers 13', 13" are in contact with cold heat exchange surfaces in the recuperator 14 not at all or at most for a very short time.

A numerical example will serve to further explain the temperatures, pressures and mass flows which are important for the operation of the invention. Let the circulation pressure in the heat storage system be 20 bar, the temperature of the cold water 60° C. and that of the hot water 180° C. The latter can be achieved with little effort, if the heating element 18 is fed with air at 230° C. from the low pressure compressor 2' and cools this to 150° C. The gas turbine is operated with a mass flow of 300 kg/sec, the latter having a storage temperature of 30° C. If the hot water mass flow is 50 kg/sec, then the working fluid in the air heater 21 can be pre-heated to 110° C. entry temperature to the recuperator 14. In the recuperator 14 heat is removed from the flue gas between 440° C. turbine exit temperature and 150° C. flue entry temperature. If this air pre-heating is to be maintained continuously during an 8-hour turbine operation, then a heat storage volume of 1,600 m$^3$ is required. If, however, the pre-heating is only to be carried out during a 10 minute start-up period, then a storage volume of 1/50th of this would be adequate.

In connection with this numerical example it should also be mentioned that the invention achieves its greatest effect precisely during the important beginning period of the start-up process. Because the air mass flow is still considerably restricted by the air valve 22, the air, at a given exchange surface, is heated more strongly in the air heater 21 than during normal operation, perhaps to about 150° C., which leads to rapid heating of the exchanger surfaces in the recuperator 14 which are at risk.

The invention is, of course, not restricted to what is represented and described. Heat can equally well be removed in the intercooler 8 or in the aftercooler 9. Furthermore, depending on the design of the two partial circuits and their components, only one circulating pump could be used. Finally, the choice, too, of the storage volume is a question of the cost optimization of the electricity generation.

I claim:

1. A method for operating an air storage power station having a gas turbine with an upstream combustion chamber, a compressor, an air reservoir receiving compressed air from said compressor and selectively connected to said combustion chamber for supplying compressed air to said combustion chamber, an electrical machine operatively connected to said gas turbine and said compressor, a recuperator providing heat exchange between air being supplied to said combustion chamber and gas being discharged from said gas turbine, and means for storing and selectively transferring heat from said compressor to said air being supplied to said combustion chamber at a point upstream of said recuperator, said method comprising the steps of:

initiating the supply of compressed air from said reservoir to said combustion chamber so as to begin turbine operation;

transferring stored heat from said means for storing to said supplied air; and limiting said transfer of supplied heat to a start up period of said turbine operation.

* * * * *